United States Patent
Honma et al.

(10) Patent No.: US 10,858,265 B2
(45) Date of Patent: Dec. 8, 2020

(54) ALUMINUM-COATED NICKEL COBALT CONTAINING COMPOSITE HYDROXIDE AND METHOD FOR MANUFACTURING SAME, CATHODE ACTIVE MATERIAL FOR NON-AQUEOUS ELECTROLYTE SECONDARY BATTERY AND METHOD FOR MANUFACTURING SAME, AND NON-AQUEOUS ELECTROLYTE SECONDARY BATTERY

(71) Applicant: SUMITOMO METAL MINING CO., LTD., Tokyo (JP)

(72) Inventors: Takehide Honma, Ehime (JP); Koji Yamaji, Ehime (JP); Ryozo Ushio, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 279 days.

(21) Appl. No.: 15/569,504

(22) PCT Filed: Apr. 27, 2016

(86) PCT No.: PCT/JP2016/063304
§ 371 (c)(1),
(2) Date: Oct. 26, 2017

(87) PCT Pub. No.: WO2016/175268
PCT Pub. Date: Nov. 3, 2016

(65) Prior Publication Data
US 2018/0215629 A1    Aug. 2, 2018

(30) Foreign Application Priority Data

Apr. 28, 2015 (JP) ................................ 2015-092123

(51) Int. Cl.
| | | |
|---|---|---|
| C01G 53/00 | (2006.01) |
| H01M 4/525 | (2010.01) |
| H01M 4/485 | (2010.01) |
| H01M 4/36 | (2006.01) |
| H01M 4/131 | (2010.01) |
| H01M 10/052 | (2010.01) |

(Continued)

(52) U.S. Cl.
CPC .......... *C01G 53/44* (2013.01); *C01G 53/006* (2013.01); *C01G 53/42* (2013.01); *H01M 4/131* (2013.01); *H01M 4/366* (2013.01); *H01M 4/485* (2013.01); *H01M 4/505* (2013.01); *H01M 4/525* (2013.01); *H01M 10/052* (2013.01); *H01M 10/0525* (2013.01); *C01P 2004/03* (2013.01); *C01P 2004/39* (2013.01); *C01P 2004/50* (2013.01); *C01P 2004/61* (2013.01); *C01P 2004/62* (2013.01); *C01P 2004/64* (2013.01); *C01P 2004/80* (2013.01); *C01P 2006/11* (2013.01); *C01P 2006/12* (2013.01)

(58) Field of Classification Search
CPC ...... H01M 4/485; H01M 4/505; H01M 4/525; C01P 2006/12
See application file for complete search history.

(56) References Cited

U.S. PATENT DOCUMENTS

2007/0231691 A1   10/2007  Abe et al.
2013/0108921 A1   5/2013   Kase et al.
(Continued)

FOREIGN PATENT DOCUMENTS

| CN | 1868895 A | 11/2006 |
|---|---|---|
| CN | 102916172 A | 2/2013 |

(Continued)

OTHER PUBLICATIONS

Notification of Reasons for Refusal dated Jan. 31, 2019, from Japanese Patent Application No. JP 2015-092123.

(Continued)

*Primary Examiner* — Ladan Mohaddes
(74) *Attorney, Agent, or Firm* — Katten Muchin Rosenman LLP

(57) ABSTRACT

Provided is a cathode active material for a non-aqueous electrolyte secondary battery that improves the cycling characteristic and high-temperature storability without impairing the charge/discharge capacity and the output characteristics. A nickel cobalt containing composite hydroxide is obtained by using a batch type crystallization method in which a raw material aqueous solution that includes Ni, Co and Mg is supplied in an inert atmosphere to a reaction aqueous solution that is controlled so that the temperature is within the range 45° C. to 55° C., the pH value is within the range 10.8 to 11.8 at a reference liquid temperature of 25° C., and the ammonium-ion concentration is within the range 8 g/L to 12 g/L. An Al-coated composite hydroxide that is expressed by the general formula: $Ni_{1-x-y-z}Co_xAl_yMg_z(OH)_2$ (where, $0.05 \leq x \leq 0.20$, $0.01 \leq y \leq 0.06$, and $0.01 \leq z \leq 0.03$) is obtained by mixing a slurry that includes the nickel cobalt containing composite hydroxide with a coating aqueous solution that includes Al to form a mixed aqueous solution, and coating the secondary particles with a coating film that includes Al or an Al compound. A cathode active material that is configured so that component elements that include Al are uniformly dispersed in the secondary particles is synthesized using the Al-coated composite hydroxide as a precursor.

6 Claims, 1 Drawing Sheet

(51) Int. Cl.
H01M 4/505 (2010.01)
H01M 10/0525 (2010.01)

(56) References Cited

U.S. PATENT DOCUMENTS

2014/0186709 A1   7/2014   Iwanaga et al.
2014/0377660 A1*  12/2014  Fukui .................... H01M 4/505
                                                         429/223
2015/0108398 A1   4/2015   Kase et al.

FOREIGN PATENT DOCUMENTS

| JP | 2007-273108 A | 10/2007 |
| JP | 201024083 A | 2/2010 |
| JP | 2010034083 A | 2/2010 |
| JP | 2013-026199 A | 2/2013 |
| JP | 2013171743 A | 9/2013 |
| WO | 2011122448 A1 | 10/2011 |
| WO | WO2013094701 * | 6/2013 |

OTHER PUBLICATIONS

The First Office Action dated Feb. 2, 2019 from the corresponding Chinese Patent Application No. 201680024376.3.
International Search Report and Written Opinion dated Jul. 12, 2016, from the corresponding PCT/JP2016/063304.

* cited by examiner

ALUMINUM-COATED NICKEL COBALT CONTAINING COMPOSITE HYDROXIDE AND METHOD FOR MANUFACTURING SAME, CATHODE ACTIVE MATERIAL FOR NON-AQUEOUS ELECTROLYTE SECONDARY BATTERY AND METHOD FOR MANUFACTURING SAME, AND NON-AQUEOUS ELECTROLYTE SECONDARY BATTERY

TECHNICAL FIELD

The present invention relates to an aluminum-coated nickel cobalt containing composite hydroxide and method for manufacturing the same, a cathode-active material for a non-aqueous electrolyte secondary battery having the aluminum-coated nickel cobalt containing composite hydroxide as a precursor and a method for manufacturing the same, and a non-aqueous electrolyte secondary battery.

BACKGROUND ART

In recent years, as portable electronic devices such as portable telephones, notebook personal computers, and the like have become popular, development of a compact and lightweight secondary battery having high-energy density is strongly desired. Moreover, development of a high-output secondary battery as a power source for a motor drive, and particularly as a power source for transporting equipment is also strongly desired. As a secondary battery that satisfies these needs is a lithium-ion secondary battery that is a non-aqueous electrolyte secondary battery. A non-aqueous electrolyte secondary battery includes an anode, a cathode, an electrolyte and the like, and an active material that is capable of desorbing and inserting lithium is used for the material of the anode and the cathode.

Currently much research and development is actively being conducted for a non-aqueous electrolyte secondary battery, and particularly, a non-aqueous electrolyte secondary battery that uses a lithium transition metal containing composite oxide having a layered structure or a spinel structure can obtain 4V class high voltage, so practical use of such a battery as a battery having high-energy density is progressing.

As the cathode material for this kind of non-aqueous electrolyte secondary battery, currently lithium transition metal containing composite oxides such as a lithium cobalt composite oxide ($LiCoO_2$) for which synthesis is relatively easy, a lithium nickel composite oxide ($LiNiO_2$) that uses nickel that is less expensive than cobalt, a lithium nickel cobalt manganese composite oxide ($LiNi_{1/3}Co_{1/3}Mn_{1/3}O_2$), a lithium manganese composite oxide that uses manganese ($LiMn_2O_4$), a lithium nickel manganese composite oxide ($LiNi_{0.5}Mn_{0.5}O_2$) and the like have been proposed.

Of these as well, a lithium nickel composite oxide is attracting attention as a cathode active material that has a larger charge/discharge capacity than a lithium cobalt composite oxide, and can be used in the manufacture of a comparatively inexpensive, high-energy density secondary battery. However, a lithium nickel composite oxide has problems in that when compared with a lithium cobalt composite oxide, the stability of the crystal structure is low, and the cycling characteristic and thermal stability are inferior.

In regard to these problems, typically part of the nickel of the lithium nickel composite oxide is replaced with a transition metal element such as cobalt, manganese, iron and the like, or a different type of metal element such as aluminum, magnesium, vanadium, tin and the like, and as a result, the stability of the crystal structure is improved. Of these metal elements, it is known that cobalt is effective for preventing phase transition, and aluminum is effective for stabilizing the crystal structure. However, there is a possibility that by adding a metal element that does not contribute to the Redox reaction, the high charge/discharge capacity that is an intrinsic feature of a lithium nickel composite oxide will be greatly lost. Particularly, in the case using a co-precipitation method to obtain a nickel-containing composite hydroxide that is the precursor to a lithium nickel containing composite oxide that includes aluminum, aluminum inhibits the densification of the nickel containing composite hydroxide, so a decrease in the charge/discharge capacity of the lithium nickel containing composite oxide that is finally obtained is inevitable. Therefore, development of a lithium nickel containing composite oxide that is able to improve the stability of the crystal structure without a loss in charge/discharge capacity is desired.

For example, JP2010024083(A) describes a method for continuously manufacturing an aluminum hydroxide coated nickel cobalt containing composite hydroxide by connecting reaction vessels in a two-stage cascade, and first, individually and simultaneously supplying a raw material solution that is composed of an aqueous solution that includes a nickel compound and cobalt compound, a sodium hydroxide aqueous solution and an aqueous solution that includes an ammonium ion donor to the first-stage reaction vessel and causing a reaction to generate a nickel cobalt composite hydroxide, then, while supplying the nickel cobalt composite hydroxide, also supplying a sodium aluminate aqueous solution and sulfuric acid aqueous solution to the second-state reaction vessel and causing a reaction; with the aluminum hydroxide coated nickel cobalt containing composite hydroxide being expressed by the general formula: $Ni_{1-x}Co_x(OH)_2$ (where x in the formula is 0.01 to 0.3), and having a coating layer that includes aluminum, with the amount of aluminum included with respect to the overall mass being 0.1% to 5% by mass.

With this manufacturing method, the aluminum hydroxide coated nickel cobalt containing composite hydroxide is not affected by aluminum during the co-precipitation reaction, so a highly dense nickel cobalt composite hydroxide is obtained. Moreover, when calcining this aluminum hydroxide coated nickel cobalt containing composite hydroxide, aluminum can be uniformly dispersed into the particles of nickel cobalt composite hydroxide, so even when a very little amount is added, it is possible to improve the stability of the crystal structure of the lithium nickel cobalt composite oxide that is finally obtained. In other words, with this manufacturing method, it is considered possible to improve the cycling characteristic and thermal stability of a cathode active material that includes lithium nickel containing composite oxide without a loss in the charge/discharge capacity. However, in this manufacturing method, the percentage of rough particles increases, so it is difficult to sufficiently maintain the specific surface area of the lithium nickel composite oxide, and there is a possibility that when used in a secondary battery, the output characteristics of the cathode active material will greatly decrease.

In regard to this, as a cathode active material that is capable of improving the output characteristics, WO2011/122448 proposes a lithium nickel composite oxide that includes secondary particles that are an aggregate of primary particles that are expressed by the general formula; $(Ni_{1-x-y}Co_xAl_y)_{1-z}M_zO_2$ (where, $0.98 \leq w \leq 1.10$, $0.05 \leq x \leq 0.3$, $0.01 \leq y \leq 0.1$, $0 \leq z \leq 0.05$, and M is at least one kind of metal element that is selected from among Mg, Fe, Cu, Zn, and Ga), and the crystal particle size of the plane (003) that is found by X-ray diffraction and the Scherrer equation is 1200 Å to 1600 Å. As a precursor for this cathode active material, WO2011/122448 proposes a nickel composite hydroxide and preferably a nickel composite hydroxide of which the surface of the hydroxide includes Ni, Co, and M being coated with an aluminum hydroxide, that is obtained by co-precipitation and expressed by the general expression: $(Ni_{1-x-y}Co_xAl_y)_{1-z}M_z(OH)_2$ (where, $0.05 \leq x \leq 0.3$, $0.01 \leq y \leq 0.1$, $0 \leq z \leq 0.05$, and M is at least one kind of metal element that is selected from among Mg, Fe, Cu, Zn, and Ga), and the half-value width of the plane (101) found by X-ray diffraction is 0.45° to 0.80.

However, the cathode active material that is described in WO2011/122448 is mainly for improving the output characteristics in a low-temperature environment, and improvement of the cycling characteristic and high-temperature storability is not intended at all.

RELATED LITERATURE

Patent Literature

[Patent Literature 1] JP2010034083 (A)
[Patent Literature 2] WO2011/122448

SUMMARY OF INVENTION

Problem to be Solved by Invention

An object of the present invention is to provide a cathode active material for a non-aqueous electrolyte secondary battery and a method for manufacturing the same that improves the cycling characteristic and high-temperature storability without a loss of either the charge/discharge capacity and output characteristic of the cathode active material that includes a lithium nickel composite oxide. Moreover, another object of the present invention is to provide an aluminum-coated nickel cobalt containing composite hydroxide as a precursor to the cathode active material, and to a method for manufacturing the same. Furthermore, another object of the present invention is to provide a non-aqueous electrolyte secondary battery that uses this cathode active material.

Means for Solving Problems

The aluminum-coated nickel cobalt containing composite hydroxide of the present invention is expressed by the general formula: $Ni_{1-x-y-z}Co_xAl_yMg_z(OH)_2$ (where, $0.05 \leq x \leq 0.20$, $0.01 \leq y \leq 0.06$, and $0.01 \leq z \leq 0.03$), and includes secondary particles having a solid structure that are formed by an aggregate of plural primary particles, and that are coated by a coating film that includes aluminum or an aluminum compound; wherein the average particle size of the secondary particles is within the range 4 μm to 7 μm or less, the tap density is 1.5 g/mL or greater, and the specific surface area is within the range 5.5 m²/g to 7.5 m²/g.

Preferably, the thickness of the coating film is within the range 0.001 μm to 0.01 μm.

Preferably, the primary particles have a rectangular parallelepiped shape, and the average particle size of the primary particles is within the range 0.01 μm to 0.1 μm.

The method of the present invention for manufacturing an aluminum-coated nickel cobalt containing composite hydroxide includes:

a crystallization step for obtaining nickel cobalt containing composite hydroxide that includes secondary particles having a solid structure that is formed by an aggregate of plural primary particles using a batch type crystallization method in which a raw material aqueous solution that includes nickel, cobalt and magnesium is supplied in an inert atmosphere to a reaction aqueous solution that is controlled so that the temperature is within the range 45° C. to 55° C., the pH value is within the range 10.8 to 11.8 at a reference liquid temperature of 25° C., and the ammonium-ion concentration is within the range 8 g/L to 12 g/L; and a coating step for obtaining an aluminum-coated nickel cobalt containing composite hydroxide that is expressed by the general formula: $Ni_{1-x-y-z}Co_xAl_yMg_z(OH)_2$ (where, $0.05 \leq x \leq 0.20$, $0.01 \leq y \leq 0.06$, and $0.01 \leq z \leq 0.03$), by mixing a slurry that includes the nickel cobalt containing composite hydroxide with a coating aqueous solution that includes aluminum to form a mixed aqueous solution, and coating the secondary particles with a coating film that includes aluminum or an aluminum compound.

Preferably, the pH value of the mixed aqueous solution is controlled to be within the range 9.6 to 10.4 at a reference liquid temperature of 25° C.

Preferably, the method for manufacturing an aluminum-coated nickel cobalt containing composite hydroxide further includes a drying step for drying the aluminum-coated nickel cobalt containing composite hydroxide by heating the aluminum-coated nickel cobalt containing composite hydroxide to a temperature within the range 110° C. to 130° C.

The cathode active material for a non-aqueous electrolyte secondary battery of the present invention includes a lithium nickel cobalt composite oxide that is expressed by the general formula: $Li_uNi_{1-x-y-z}Co_xAl_yMg_zO_2$ (where $1.00 \leq u \leq 1.04$, $0.05 \leq x \leq 0.20$, $0.01 \leq y \leq 0.06$, and $0.01 \leq z \leq 0.03$) and that includes secondary particles having a solid structure that are formed by an aggregate of plural primary particles, wherein the average particle size of the secondary particles is within the range 4 μm to 7 μm, the tap density is 2.0 g/mL or greater, and the specific surface area is within the range 0.7 m²/g to 1.0 m²/g.

Preferably, the primary particles have a rectangular parallelepiped shape, and the average particle size of the primary particles is within the range 0.05 μm to 0.5 μm.

The method of the present invention for manufacturing a cathode active material for a non-aqueous electrolyte secondary battery is a method for manufacturing a cathode active material for a non-aqueous electrolyte secondary battery that includes a lithium nickel cobalt composite oxide having a layered structure that is expressed by the general formula: $Li_uNi_{1-x-y-z}Co_xAl_yMg_zO_2$ (where $1.00 \leq u \leq 1.04$, $0.05 \leq x \leq 0.20$, $0.01 \leq y \leq 0.06$, and $0.01 \leq z \leq 0.03$) and that includes secondary particles having a solid structure that are formed by an aggregate of plural primary particles, includes:

a mixing step for obtaining a lithium mixture by mixing the aluminum-coated nickel cobalt containing composite hydroxide of the present invention with a lithium compound; and a calcination step for obtaining a lithium nickel cobalt containing composite oxide by calcining the lithium mixture in an oxidizing atmosphere in which the oxygen concentration is 98% by volume or greater.

Preferably, the calcination temperature in the calcination step is within the range 700° C. to 800° C.

Preferably, the method for manufacturing a cathode active material for a non-aqueous electrolyte secondary battery further includes an oxidation roasting step that oxidizes and roasts aluminum-coated nickel cobalt containing composite hydroxide before the mixing step.

Preferably, the oxidation roasting temperature in the oxidation roasting step is equal to or less than the calcination temperature, and is within the range 600° C. to 800° C.

The non-aqueous electrolyte secondary battery of the present invention includes a cathode, an anode, a separator and a non-aqueous electrolyte, wherein the cathode active material for a non-aqueous electrolyte secondary battery of the present invention is used as the cathode material of the cathode.

Effect of Invention

With the present invention, it is possible to uniformly disperse aluminum an additive element into secondary particles of cathode active material for a non-aqueous electrolyte secondary battery, and to improve the cycling characteristic and high-temperature storability without impairing the charge/discharge capacity and output characteristics of cathode active material that includes lithium nickel containing composite oxide. Therefore, by using a cathode active material having characteristics such as these as the cathode material, it is possible to improve the battery characteristics of a non-aqueous electrolyte secondary battery. Moreover, with the present invention, it is possible to provide aluminum-coated nickel cobalt containing composite hydroxide on an industrial scale as a precursor that makes it possible to achieve a cathode active material having characteristics such as these. Therefore, the industrial significance of the present invention is extremely large.

MODES FOR CARRYING OUT INVENTION

Figure 1:
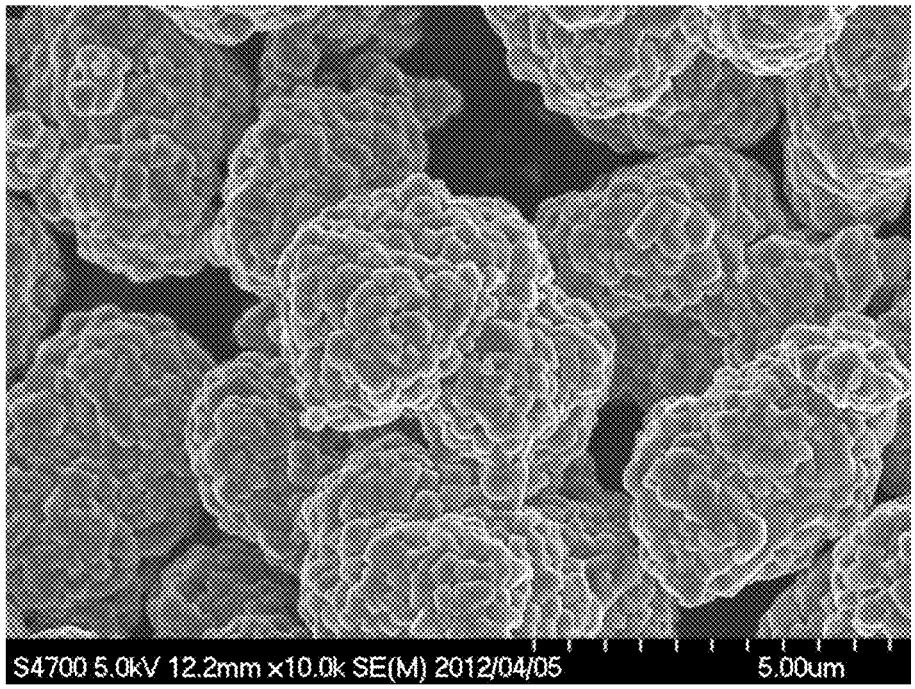
FIG. 1 is an SEM image (10000×) of the cathode active material obtained in an Example 1.
Figure 2:
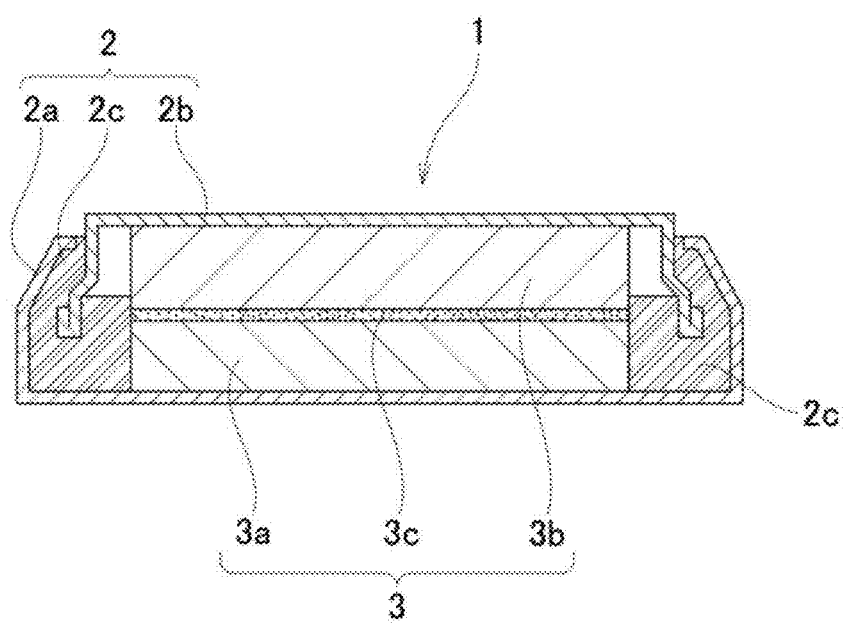
FIG. 2 is a schematic sectional view of a 2032-type coin battery that is used for evaluation.

In consideration of the problems described above, the inventors diligently researched a cathode active material that is capable of improving the cycling characteristic and high-temperature storability without loss of the charge/discharge capacity and output characteristic when configuring a non-aqueous electrolyte secondary battery.

In the conventional technology, including that disclosed in WO2011/122448, when obtaining an aluminum-coated nickel cobalt containing composite hydroxide that is used as precursor for the cathode active material by co-precipitation, the reaction atmosphere is typically an oxidizing atmosphere. As a result, it becomes possible to improve the output characteristics of the cathode active material by making the primary particles that form secondary particles of the aluminum-coated nickel cobalt containing composite hydroxide fine, forming a large number of voids between the primary particles in which electrolyte can penetrate, and increasing the contact surface area between the secondary particles and the electrolyte. However, in this kind of technology, aluminum may segregate at high concentration, so by aluminum becoming oxidized in the process of synthesizing the cathode active material, areas in which passive aluminum oxide is present in high concentration are formed in the cathode active material. As a result, the aluminum oxide becomes a resistance layer, and when a secondary battery is formed, this leads to a decrease in the charge/discharge capacity and output characteristic of the cathode active material.

Based on these points, the inventors learned from further diligent research that together with adding a very small amount of magnesium to the aluminum-coated nickel cobalt containing composite hydroxide, by performing the crystallization reaction in an inert atmosphere, it is possible to promote growth of secondary particles while preventing oxidation of primary particles. Moreover, it was learned that cathode active material having this aluminum-coated nickel cobalt containing composite hydroxide as a precursor is such that when forming a secondary battery, it is possible to simultaneously improve the cycling characteristic and high-temperature storability without loss of charge/discharge capacity and output characteristic. The present invention was achieved based on these findings.

1. Aluminum-Coated Nickel Cobalt Containing Composite Hydroxide 1-1. Aluminum-Coated Nickel Cobalt Containing Composite Hydroxide (1) Composition The aluminum-coated nickel cobalt containing composite hydroxide (hereafter, referred to as "Al-coated composite hydroxide") of the present invention is expressed by the general formula: $Ni_{1-x-y-z}Co_xAl_yMg_z(OH)_2$ (where, $0.05 \leq x \leq 0.20$, $0.01 \leq y \leq 0.06$, $0.01 \leq z \leq 0.03$). The amounts of nickel (Ni), cobalt (Co), aluminum (Al), magnesium (Mg) that are included and the critical significance thereof are the same as in the case of the cathode active material describe below, so an explanation here is omitted.

(2) Particle Structure

The Al-coated composite hydroxide of the present invention includes secondary particles that are formed by an aggregate of plural primary particles. The secondary particles are preferably mostly spherical. Here, mostly spherical includes not only secondary particles that have a spherical shape, but also includes secondary particles that have a spherical shape having fine unevenness on the surface, an oval spherical shape or the like.

Moreover, the secondary particles of the Al-coated composite hydroxide of the present invention has a structure in which the main part having a solid structure in which nickel, cobalt and magnesium are uniformly dispersed is coated by a coating film that includes aluminum or aluminum compound. As a result, it is possible to stabilize the particle structure and crystal structure of the cathode active material having this Al-coated composite hydroxide as a precursor while suppressing the amount of aluminum added, so it becomes possible to improve the cycling characteristic of the obtained cathode active material without a loss of charge/discharge capacity or output characteristic.

In this kind of Al-coated composite hydroxide, the thickness of the coating film is preferably controlled to be within the range 0.001 μm to 0.01 μm, and more preferably within the range 0.004 μm to 0.007 μm. When the thickness of the coating film is less than 0.001 μm, the amount of aluminum or aluminum compound is too little, so there is a possibility that aluminum will not be uniformly dispersed in the calcination step. However, when the thickness of the coating film is greater than 0.01 μm, there is a possibility that areas in which there is a high concentration of aluminum present will be formed on and near the surface of the cathode active material obtained using this Al-coated composite hydroxide as a precursor. In this case, the insertion reaction and desorption reaction of lithium are inhibited, and the characteristics of the cathode active material are impaired.

The particle shape of the secondary particles of the Al-coated composite hydroxide can be confirmed by observation using a scanning electron microscope (SEM). Moreover, the particle structure of the secondary particles can be confirmed by embedding the Al-coated composite hydroxide in resin, then using a cross-section polisher process or the like to create a state in which the cross section can be observed, and performing SEM observation. Furthermore, the thickness of the coating film can be measured by characteristic X-ray spectroscopic analysis (energy dispersive X-ray analysis: EDX).

(3) Average Particle Size of Secondary Particles

The average particle size of the secondary particles must be within the range 4 μm to 7 μm, and preferably within the range 4.2 μm to 6.5 μm, and even more preferably within the range 5.0 μm to 6.0 μm. By controlling the average particle size to be within such a range, it becomes possible to control the average particle size of the cathode active material obtained using this Al-coated composite hydroxide as a precursor to be within a suitable range. However, when the average particle size is less than 4 μm, not only does it take time in the crystallization step (described later) for solid-liquid separation of the crystallized Al-coated composite hydroxide to occur, but it also becomes easy for the Al-coated composited hydroxide to scatter after drying. On the other hand, when the average particle size is greater than 7 μm, this leads to the cathode active material obtained using this Al-coated composite hydroxide as a precursor to become coarse. In the present invention, the average particle size means a mean volume diameter (MV), and can be found from the volume integrated value that is measured by using a laser light diffraction scattering type particle size analyzer.

(4) Shape and Average Particle Size of Primary Particles

The shape of the primary particles of the secondary particles is preferably a rectangular parallelepiped shape. Moreover, the average particle size of the primary particles is preferably within the range 0.01 μm to 0.1 μm, and more preferably within the range 0.04 μm to 0.07 μm. By the shape and average particle size of the primary particles satisfying such conditions, it is possible to make the density of the secondary particles higher. In the present invention, a rectangular parallelepiped shape includes not only a shape in which the cross-sectional shape is formed into a rectangular shape, but also includes a cross-sectional shape that is formed into a square shape other than a rectangular shape, or a shape in which one surface of the rectangular parallelepiped is a curved surface.

The shape of the primary particles, as in the case of observing the particle structure of the secondary particles described above, can be confirmed by creating a state in which the cross section of the secondary particles can be observed, and then performing SEM observation. Moreover, in the present invention, the average particle size of the primary particles means the crystallite diameter, and can be found from the Scherrer equation below using the results from powder X-ray diffraction measurement.

Crystallite Diameter (Å)=0.9λ/(β cos θ)   <Scherrer Equation> where,

λ: Wavelength of the X-ray tube that is used (CuKα=1.542 Å)

β: Half width at the diffraction peak from each surface

θ: Diffraction angle (5) Tap Density

The tap density of the secondary particles must be 1.5 g/mL or greater, and preferably 1.6 g/mL or greater, and more preferably 1.7 g/mL. When the tap density is less than 1.5 g/mL, the filling property of cathode active material obtained using this Al-coated composite hydroxide as a precursor becomes low. On the other hand, the upper limit value of the tap density is not particularly limited, however, in normal manufacturing conditions, is about 2.4 g/mL. In the present invention, the tap density is based on JIS Z-2504, and means the bulk density of a sample powder that is collected in a container after tapping 100 times, and can be measured by using a shaking type specific gravity measuring device.

(6) Specific Surface Area

The specific surface area of the secondary particles is preferably within the range of 5.5 m$^2$/g to 7.5 m$^2$/g, and more preferably within the range 5.5 m$^2$/g to 7.0 m$^2$/g. By controlling the specific surface area to be within such a range, it is possible to control the specific surface area of the cathode active material that has this Al-coated composite hydroxide as a precursor to be within a suitable range (0.7 m$^2$/g to 1.0 m$^2$/g). In the present invention, the specific surface area can be measured by the BET method using nitrogen gas adsorption.

1-2. Method for Manufacturing Aluminum-Coated Nickel Cobalt Containing Composite Hydroxide.

The method for manufacturing Al-coated composite hydroxide of the present invention is a method for manufacturing the Al-coated composite hydroxide of the present invention described above, and includes: a crystallization step for obtaining nickel cobalt composite hydroxide (hereafter, referred to as "composite hydroxide") that includes secondary particles having a solid structure that is formed by an aggregate of plural primary particles, by supplying a raw material aqueous solution that includes nickel, cobalt and magnesium to a reaction aqueous solution that is controlled such that the atmosphere is an inert atmosphere, the temperature is within the range 45° C. to 55° C., the pH value at a reference liquid temperature of 25° C. is within the range 10.8 to 11.8, and the ammonium ion concentration is within the range 8 g/L to 12 g/L, and performing a crystallization reaction; and a coating step for obtaining Al-coated composite hydroxide by mixing a slurry that includes this composite hydroxide a coating aqueous solution that includes aluminum, and coating the secondary particles of the composite hydroxide with a coating film that includes aluminum or an aluminum compound.

(1) Crystallization Step

The crystallization step is a process for obtaining composite hydroxide by supplying a raw material aqueous solution that includes nickel, cobalt and magnesium to a reaction aqueous solution that is controlled such that the atmosphere is an inert atmosphere, the temperature is within the range 45° C. to 55° C., the pH value at a reference liquid temperature of 25° C. is within the range 10.8 to 11.8, and the ammonium ion concentration is within the range 8 g/L to 12 g/L, and performing a batch type crystallization reaction.

When a continuous crystallization method is used as the crystallization method, the particle size of the secondary particles of the obtained composite hydroxide is not uniform, so there is a problem in that variation occurs in the coating amount of aluminum. In order to avoid this problem, in the method for manufacturing the Al-coated composite hydroxide of the present invention, it is necessary to employ a batch type crystallization method as the crystallization method.

a) Supply Aqueous Solution
[Raw Material Aqueous Solution]

It is necessary to use an aqueous solution that includes nickel, cobalt and magnesium as the raw material aqueous solution. The ratios of these metal elements are normally adjusted so as to become the compositional ratios of the target composite hydroxide. In other words, the ratios (atomic ratios) of the metal elements (nickel, cobalt, magnesium) in the raw material aqueous solution are adjusted so as to be Ni:Co:Mg=(1-x-y-z):x:z (where, $0.05 \leq x \leq 0.20$, $0.01 \leq y \leq 0.06$, $0.01 \leq z \leq 0.03$).

As the supply source of metal elements, it is possible to use water-soluble metal compounds, and more specifically, it is possible to use nitrates, sulfates, chlorides and the like. Of these, considering cost and inclusion of halogen, preferably a suitable sulfate salt is used.

Moreover, the concentration of raw material aqueous solution for the total metal compounds is preferably adjusted to be within the range 1.0 mol/L to 2.6 mol/L, and more preferably adjusted to be within the range 1.5 mol/L to 2.2 mol/L. When the concentration of the raw material aqueous solution is less than 1.0 mol/L, the amount of crystallization per reaction tank decreases, so productivity decreases. On the other hand, when the concentration of raw material aqueous solution is greater than 2.6 mol/L, the saturated concentration at normal temperature is exceeded, so crystals of the metal compounds are re-precipitated, and there is a possibility of clogging of the piping and the like.

The metal compounds do not necessarily need to be supplied to the reaction tank as raw material aqueous solution. For example, when performing the crystallization reaction using metal compounds that result in the generation of compounds other than the target compounds when mixed and reacted, metal compound aqueous solutions can be individually prepared so that the concentration of the total metal compound aqueous solutions are within the range described above, and the individual metal compound aqueous solutions can be supplied into the reaction tank at specified ratios.

[Alkali Aqueous Solution]

The alkali aqueous solution that adjusts the pH value in the reaction aqueous solution is not particularly limited, and it is possible to use a typical alkali metal hydroxide aqueous solution such as sodium hydroxide, potassium hydroxide or the like. The alkali metal hydroxide can be added directly to the reaction aqueous solution, however, from the aspect of the ease of controlling the pH value, preferably is added as an aqueous solution. In this case, the concentration of the alkali metal hydroxide is preferably adjusted to be within the range 20% by mass to 50% by mass, and more preferably is adjusted to be within the range 20% by mass to 30% by mass. By regulating the concentration of the alkali metal aqueous solution to this kind of range, it is possible to prevent the pH value from increasing locally at the position where added, while at the same time suppress the amount of solvent (amount of water) supplied to the reaction system, so it is possible to effectively obtain secondary particles of composite hydroxide having a narrow particle size distribution.

The method for supplying alkali aqueous solution is not particularly limited as long as it is possible to maintain the pH value of the reaction aqueous solution to a specified range without the pH value becoming high locally; for example, the alkali aqueous solution can be supplied by a pump such as a metering pump that is capable of controlling the amount of flow while sufficiently stirring the reaction aqueous solution.

[Aqueous Solution Including an Ammonium Ion Donor]

An aqueous solution that includes an ammonium ion donor is for adjusting the solubility of metal ions in the reaction aqueous solution, and is added arbitrarily. This kind of aqueous solution that includes an ammonium ion donor is also not particularly limited, and for example, it is possible to use an aqueous solution such as ammonia water, ammonium sulfate, ammonium chloride, ammonium carbonate, ammonium fluoride or the like.

When ammonia water is used as the ammonium-ion donor, the concentration of the ammonia water is preferably adjusted to be within the range 20% by mass to 30% by mass, and more preferably within the range 22% by mass to 28% by mass. By regulating the concentration of the ammonia water to be within such a range, it is possible to keep the loss of ammonia due to volatilization to a minimum, so it is possible to improve production efficiency.

The method for supplying the aqueous solution that includes an ammonium-ion donor, as in the case of alkali aqueous solution, can be a pump that is capable of controlling the amount of flow.

b) Reaction Conditions
[Reaction Atmosphere]

In the method for manufacturing the Al-coated composite hydroxide of the present invention, the atmosphere during the crystallization step (reaction atmosphere) must be an inert atmosphere in which the oxygen concentration is 2% by volume or less, and preferably 0.5% by volume or less. In other words, preferably the atmosphere is an inert atmosphere that includes an inert gas such as nitrogen, argon or the like and includes hardly any oxygen, and more preferably the inert gases are sprayed, and contact between the reaction aqueous solution and oxygen is completely shut off. By controlling the reaction atmosphere during the crystallization step to be an inert atmosphere, it is possible to obtain secondary particles that are highly dense and that have a suitable average particle size. However, when the oxygen concentration in the reaction atmosphere is greater than 2% by volume, growth of secondary particles that is caused by oxidation of the primary particles of the composite hydroxide is suppressed, so it becomes impossible to improve the charge/discharge capacity of the cathode active material that is finally obtained.

[Reaction Temperature]

The temperature of the reaction aqueous solution (reaction temperature) must be controlled to be within the range 45° C. to 55° C., and preferably within the range 48° C. to 52° C. By controlling the reaction temperature to be within this kind of range, it is possible to obtain secondary particles that are highly dense and that have a suitable average particle size. However, when the reaction temperature is less than 45° C. or greater than 55° C., the secondary particles of composite hydroxide become amorphous and very minute, so it becomes difficult to improve the charge/discharge capacity of the cathode active material that is finally obtained. Moreover, it becomes difficult to perform solid-liquid separation of the secondary particles using a filter or the like, which leads to a decrease in productivity.

[pH Value]

The pH value of the reaction aqueous solution at a reference liquid temperature of 25° C. must be controlled to be within the range 10.8 to 11.8, and preferably within the range 11.1 to 11.4. By controlling the pH value to be within this kind of range, it is possible to obtain secondary particles that are highly dense and that have a suitable average particle size. However, when the pH value is less than 10.8 or greater than 11.8, the secondary particles of the composite hydroxide become amorphous and very minute, so it becomes impossible to improve the charge/discharge capacity of the cathode active material that is finally obtained.

[Ammonium Ion Concentration]

The ammonium ion concentration in the reaction aqueous solution must be controlled to be within the range 8 g/L to 12 g/L, and preferably within the range 9.5 g/L to 10.5 g/L. The ammonium ions in the reaction aqueous solution function as a complexing agent, so when the ammonium-ion concentration is less than 8 g/L, it becomes difficult to keep the solubility of metal ions constant, and it becomes easy for the reaction aqueous solution to become a gel. As a result, it becomes impossible to obtain secondary particles of composite hydroxide having uniform shape and particle size. On the other hand, when the ammonium-ion concentration is greater than 12 g/L, the solubility of metal ions becomes too large, so the amount of metal ions remaining in the reaction aqueous solution increases, which causes a deviation in composition.

(2) Washing Step

The composite hydroxide that is obtained in the crystallization step is in the form of a slurry, so after the crystallization step, it is necessary to perform solid-liquid separation using a known filtering method or the like to separate the composite hydroxide from the slurry. After that, the composite hydroxide after solid-liquid separation is washed in a washing step to remove any remaining impurities. In the present invention, the washing step is presumed to be included in part of the crystallization step.

The washing method is not particularly limited, and a known method can be used. However, washing conditions (amount of washing water, washing time, and the like) differ according to the washing method and the composition and amount of composite hydroxide to be washed, so preferably composite hydroxide or cathode active material is prepared in advance, and after confirming the amount of chlorine or impurities included in these, suitable washing conditions are selected. As a result, it is possible to control the composition and the amount of impurities of the cathode active material to be within a more suitable range. Rather than performing washing in a single operation, washing is preferably performed plural times, and more preferably is performed in two to five operations.

(3) Coating Step

The coating step is a process for obtaining Al-coated composite hydroxide by forming a mixed aqueous solution by mixing a slurry that includes the composite hydroxide that is obtained in the crystallization step with a coating aqueous solution that includes aluminum, then coating the secondary particles of the composite hydroxide with a coating that includes aluminum or an aluminum compound.

First, a suitable amount of water is added to the composite hydroxide that is obtained in the crystallization step to make a slurry, then by stirring this slurry, a dispersion solution is formed in which secondary particles of the composite hydroxide are dispersed. When doing this, the stirring time is not particularly limited as long as it is possible for the secondary particles of the composite hydroxide to become uniformly dispersed, however, approximately 15 minutes to 45 minutes is sufficient.

Next, while stirring the dispersion solution, this dispersion solution and a solution (coating solution) that includes aluminum as the coating material are mixed. As the coating solution, it is possible to use an aqueous solution in which a water-soluble aluminum salt such as sodium aluminate, aluminum sulfate, aluminum nitrate and the like is dissolved. Of these, preferably an aqueous solution that includes sodium aluminate for which wastewater treatment is easy is used. In the case of using any one of the coating solutions, the concentration of that coating solution is preferably adjusted to be within the range 0.1 mol/L to 2.0 mol/L, and more preferably is adjusted to be within the range 0.1 ml/L to 1.0 mol/L. When the concentration of coating solution is less than 0.1 mol/L, the amount supplied increases, and thus productivity worsens. On the other hand, when the concentration of the coating solution is greater than 2.0 mol/L, crystals of sodium aluminate precipitate out because it exceeds a saturated concentration thereof at normal temperature, and there is a possibility that piping and the like will become clogged. As the coating solution, it is also possible to uses an alkoxide solution that includes aluminum instead of the aqueous solution described above.

Continuing, while stirring the aqueous solution that is a mixture of the dispersion solution and the coating solution (mixed aqueous solution), drops of sulfuric acid are added so as to control the pH value at a reference liquid temperature of 25° C. to be within the range 9.6 to 10.4, and preferably within the range 9.7 to 10.2. As a result, aluminum or an aluminum compound is precipitated out onto the surface of the secondary particles of composite hydroxide, and it is possible to obtain Al-coated composite hydroxide. When the pH value of the mixed aqueous solution is less than 9.6, there is a possibility that the Al composite hydroxide will partially dissolve. However, when the pH value of the mixed aqueous solution is greater than 10.4, it is not possible for the aluminum or aluminum compound to sufficiently precipitate out, and it becomes difficult to obtain an Al-coated composite hydroxide having the target composition. In the coating step, conditions such as the temperature and the like of the mixed aqueous solution are not particularly limited, however, from the aspect of workability and the like, preferably the coating step is performed at normal temperature and normal pressure.

As the method for coating the secondary particles of composite hydroxide with aluminum or an aluminum compound, in addition to the method above, there is a method of spraying a slurry that includes aluminum or an aluminum compound on the surface of the secondary particles of composite hydroxide and allowing the slurry to dry. However, in this kind of method, variation occurs in the thickness of the film thickness, so in the cathode active material that is obtained, it is not possible to uniformly disperse the aluminum into the particles. However, when the coating method of the present invention described above, it is possible to form a uniform coating film on the surface of the secondary particles, so it is possible to uniformly disperse the aluminum into the secondary particles of the cathode active material that is obtained.

(4) Drying Step

The drying step is a process after the coating step in which the Al-coated composite hydroxide is heated to remove the remaining moisture.

The heating temperature (drying temperature) in the drying step is not necessarily a high temperature as long as it is possible to suitably remove the moisture to an extent that operations in later processes can be performed easily, and preferably is controlled to be within a range of approximately 110° C. to 130° C., and more preferably controlled to be within the range 115° C. to 125° C. When the drying temperature is less than 110° C., it takes a long time to remove the residual moisture, so productivity worsens. On the other hand, when the drying temperature is greater than 130° C., not only is it impossible to obtain the effects described above, but leads to an increase in energy and cost.

2. Cathode Active Material and Method for Manufacturing Same

2-1. Cathode Active Material (1) Composition

The cathode active material of the present invention is expressed by the general formula: $Li_uNi_{1-x-y-z}Co_xAl_yMg_zO_2$ (where $1.00 \leq u \leq 1.04$, $0.05 \leq x \leq 0.20$, $0.01 \leq y \leq 0.06$, and $0.01 \leq z \leq 0.03$). The composition of the cathode active material, as in the case of the Al-coated composite hydroxide can be found by using an ICP emission spectroscopy method and the like.

The value of "u" that indicates the amount of lithium (Li) that is included is within the range 1.00 to 1.04, and preferable within the range 1.02 to 1.03. When the value of "u" is less than 1.00, the amount of lithium is insufficient, and cathode active material that is different than the cathode active material having the desired composition is generated, so when a secondary battery is configured using this kind of cathode active material is used, the charge/discharge capacity of the cathode active material decreases. On the other hand, when the value of "u" is greater than 1.04, sintering of secondary particles of the cathode active material proceeds excessively, and the specific surface area is reduced, so similarly the charge/discharge capacity decreases.

Nickel (Ni) is an element that contributes to the high potential and high capacity of the secondary battery. The value (1-x-y-z) that indicates the amount of nickel that is included is within the range 0.71 to 0.93, and preferably within the range 0.80 to 0.88. When the value (1-x-y-z) is less than 0.71, it is not possible to improve the charge/discharge capacity of the cathode active material. On the other hand, when the value (1-x-y-z) is greater than 0.93, the amounts of cobalt, aluminum and magnesium that are included are reduced, so it becomes impossible to sufficiently obtain the effect of adding those elements.

Cobalt (Co) is an element that contributes to the improvement of the charge/discharge cycling characteristic. The value "x" that indicates the amount of cobalt that is included is within the range 0.05 to 0.20. When the value of "x" is less than 0.05, the crystal structure of this cathode active material become unstable. On the other hand, when the value of "x" is greater than 0.20, the charge/discharge capacity of the cathode active material decreases.

Aluminum (Al) is an element that contributes to the stability of the crystal structure. The value of "y" that indicates the amount of aluminum included is within the range 0.01 to 0.06, and preferably within the range 0.02 to 0.04. When the value of "y" is less than 0.01, it is not possible to sufficiently obtain the effect of the addition of aluminum. On the other hand, when the value of "y" is greater than 0.06, the amounts of elements that contribute to the Redox reaction are reduced, so the charge/discharge capacity of the cathode active material decreases.

Magnesium (Mg) is an element that, by adding a minute amount, promotes growth of secondary particles of the cathode active material, as well as contributes to stability of a secondary battery that uses this cathode active material. The value of "z" that indicates the amount of magnesium that is included is within the range 0.01 to 0.03, and preferably within the range 0.01 to 0.02. When the value of "z" is less than 0.01, it is not possible to sufficiently obtain the effect of adding magnesium. On the other hand, when the value of "z" is greater than 0.03, growth of secondary particles is suppressed, so the charge/discharge capacity of the cathode active material decreases.

In the present invention, the term lithium nickel cobalt containing composite oxide means that this oxide includes lithium, nickel and cobalt as the main component elements, and is a composite oxide of these component elements and other component elements (aluminum and magnesium). A case in which additional elements other than the component elements described above are not included, however, unavoidable impurities are included is also within the range of the present invention. This point also applies to the definition of a nickel cobalt containing composite hydroxide.

(2) Crystal Structure

Within the range of the composition of the present invention, the crystal structure of the lithium nickel cobalt containing composite oxide of the cathode active material is a layered structure, and in powder X-ray diffraction measurement, displays a diffraction pattern that is the same as lithium nickel oxide ($LiNiO_2$). In other words, the cathode active material of the present invention includes a crystal structure in which cobalt, magnesium and aluminum are uniformly dissolved in a matrix composed of $LiNiO_2$. Therefore, in the cathode active material of the present invention, it is possible to improve the stability of the crystal structure even when a very minute amount of magnesium and aluminum are added, so when configuring a secondary battery, it is possible to improve the cycling characteristic and high-temperature storability of the secondary battery without impairing the charge/discharge capacity of the cathode active material.

(3) Particle Structure

The cathode active material of the present invention inherits the particle structure of the precursor Al-coated composite hydroxide, and includes secondary particles that are formed by an aggregate of plural primary particles. Preferably, the secondary particles are mostly spherical.

Moreover, the secondary particles of the lithium nickel cobalt containing oxide of the cathode active material of the present invention has a solid structure in which lithium, nickel, cobalt, aluminum and magnesium are uniformly dispersed. In the present invention, the surface of the secondary particle of the composite hydroxide in the precursor stage is covered by a coating film that includes aluminum or an aluminum compound, so at the time of conversion from a precursor to the cathode active material, the aluminum on the surface is uniformly dispersed into the secondary particles. As a result, it is possible to stabilize the particle structure and crystal structure of the cathode active material while suppressing the added amount of aluminum; and with the present invention, an effect is obtained of improving the cycling characteristic of the cathode active material that is obtained without impairing the charge/discharge capacity and output characteristics.

(4) Average Particle Size of Secondary Particles

The average particle size of secondary particles must be within the range 4 μm to 7 μm, and preferably within the range 4.2 μm to 6.8 μm, and more preferably within the range 4.5 μm to 6.5 μm. When the average particle size is less than 4.0 μm, the filling property of the cathode active material decreases, so when configuring a secondary battery, it is not possible to increase the charge/discharge capacity of the cathode active material. On the other hand, when the average particle size is greater than 7.0 μm, the specific surface area of the cathode active material is greatly reduced, which leads to a decrease in the output characteristics.

(5) Shape and Average Particle Size of Primary Particles

The primary particles of the secondary particles preferably have a rectangular parallelepiped shape. Moreover, the average particle size of the primary particles is preferably within the range 0.05 µm to 0.5 µm, and more preferably within the range 0.1 µm to 0.5 µm. By the shape and average particle size of the primary particles satisfying such conditions as these, the density of the cathode active material (secondary particles) becomes high density, so it is possible to improve the charge/discharge capacity of the cathode active material.

(6) Tap Density

The tap density of the secondary particles must be 2.0 g/mL or greater, and preferably 2.2 g/mL or greater. When the tap density is less than 2.0 g/mL, it is not possible to improve the charge/discharge capacity of the cathode active material. On the other hand, the upper limit value of the tap density is not particularly limited, however, the upper limit under normal manufacturing conditions is about 2.4 g/mL.

(7) Specific Surface Area

The specific surface area of the secondary particles is preferably within the range 0.7 $m^2/g$ to 1.0 $m^2/g$, and more preferably within the range 0.8 $m^2/g$ to 0.9 $m^2/g$. By controlling the specific surface area to be within this kind of range, it becomes possible to improve the cycling characteristic while maintaining the output characteristics of the cathode active material. However, when the specific surface area of the cathode active material is less than 0.7 $m^2/g$, when configuring a secondary battery it is not possible to maintain the reaction surface area between the cathode active material and the electrolyte, and thus the output characteristics greatly decrease. On the other hand, when the specific surface area of the cathode active material is greater than 1.0 $m^2/g$, the reactivity with the electrolyte becomes too high, so there is a possibility that the cycling characteristic will decrease.

2-2. Manufacturing Method for Cathode Active Material

The manufacturing method for cathode active material of the present invention includes a process (mixing step) for mixing the composite hydroxide of the present invention described above with a lithium compound to obtain a lithium mixture, and a process (calcination step) for calcining the lithium mixture under specified conditions. As necessary, an oxidation roasting step, a pre-calcination step and the like that will be explained below may also be added.

(1) Oxidation Roasting Step

The oxidation roasting step is a process for obtaining a roasted material by oxidizing the Al-coated composite hydroxide after the coating step or drying step by oxidation roasting in an oxidizing atmosphere and at a temperature within the range 600° C. to 800° C. The roasted material includes not only Al-coated composite hydroxide from which excess moisture has been removed in the oxidation roasting step, but also includes Al-coated composite oxide that is obtained by converting Al-coated composite hydroxide to an oxide by the oxidation roasting step, or a mixture of Al-coated composite hydroxide and Al-coated composite oxide.

It is also possible to synthesize cathode active material by mixing the Al-coated composite hydroxide after the coating step or the drying step as is with a lithium compound and performing calcination, however, by performing oxidation roasting beforehand, it is possible to cause the synthesis reaction of cathode active material to proceed smoothly, so it becomes possible to synthesize cathode active material having better crystallinity.

The atmosphere in the oxidation roasting step is preferably an oxidizing atmosphere, and more preferably is an atmosphere having an oxygen concentration of 18% by volume or greater, and a mixed atmosphere of oxygen at the oxygen concentration described above and an inert gas is particularly preferred. In other words, the oxidation roasting step is preferably performed in an air atmosphere or in an oxygen flow. When the oxygen concentration is less than 18% by volume, it may not be possible to sufficiently oxidize the Al-coated composite hydroxide.

The heating temperature (roasting temperature) in the oxidation roasting step is equal to or less than the calcination temperature, and preferably is within the range 600° C. to 800° C., and more preferably is within the range 650° C. to 750° C. When the roasting temperature is less than 600° C., it may not be possible to sufficiently oxidize the Al-coated composite hydroxide. On the other hand, when the roasting temperature is greater than 800° C., not only is it not possible to obtain any further effect, but leads to an increase in energy cost.

The maintenance time (roasting time) at the roasting temperature is not particularly limited, however, preferably is within the range 3 hours to 15 hours, and more preferably is within the range 5 hours to 10 hours. When the roasting time is less than 3 hours, it may not be possible to sufficiently oxidize the Al-coated composite hydroxide. On the other hand, when the roasting time is greater than 15 hours, productivity greatly worsens.

The furnace that is used in the oxidation roasting step is not limited as long as the furnace is capable of heating the Al-coated composite hydroxide in an oxidizing atmosphere, however, an electric furnace in which there is no gas generation can be suitably used.

(2) Mixing Step

The mixing step is a process for obtaining a lithium mixture by mixing Al-coated composite hydroxide or the roasted material thereof with a lithium compound.

In the mixing step, the Al-coated composite hydroxide or roasted material thereof must be mixed with a lithium compound so that the ratio (Li/Me) of the number of atoms of lithium (Li) with respect to the total number of metal atoms in the lithium mixture other than lithium, and more specifically, the total number of atoms (Me) of nickel, cobalt, aluminum and magnesium is within the range 1.00 to 1.04, and preferably within the range 1.02 to 1.03. In other words, the ratio Li/Me does not change much before or after the calcination step, so the Al-coated composite hydroxide or roasted material thereof must be mixed with the lithium compound so that the ratio Li/Me in the mixing step becomes approximately the ratio Li/Me of the target cathode active material.

The lithium compound that is used in the mixing step is not particularly limited, however, from the aspect of ease of procurement, preferably lithium hydroxide, lithium nitrate, lithium carbonate, or a mixture of these is used. Particularly, in consideration of ease of handling and stability of quality, using lithium hydroxide is preferred.

Moreover, preferably the Al-coated composite hydroxide or the roasted material thereof and the lithium compound are sufficiently mixed to an extent that there is no fine powder. When mixing is not sufficient, variation occurs in the ratio Li/Me between individual secondary particles, and thus it may not be possible to obtain sufficient battery characteristics. It is possible to use a typical mixer for mixing. For example, it is possible to use a shaker mixer, a Lodige mixer, a Julia mixer, a V blender and the like.

(3) Pre-Calcination Step

When lithium hydroxide is used as the lithium compound, a pre-calcination step may be performed after the mixing step and before the calcination step by pre-calcining the lithium mixture at a temperature that is lower than the calcination temperature that will be described later, and that is within the range 350° C. to 650° C., and preferably within the range 450° C. to 550° C., or in other words at the reaction temperature (pre-calcination temperature) of lithium hydroxide and Al-coated composite hydroxide or the roasting material thereof. As a result, it is possible to sufficiently disperse the lithium into the secondary particles, and thus it is possible to obtain a more uniform cathode active material.

The time maintained at the pre-calcination temperature is preferably within the range 1 hour to 10 hours, and more preferably within the range 3 hours to 6 hours. Moreover, the atmosphere in the pre-calcination step is the same as in the calcination step that will be described later, and preferably is an oxidizing atmosphere in which the oxygen concentration is preferably 98% by volume or greater, and more preferably 99% by volume or greater.

(4) Calcination Step

The calcination step is a process for synthesizing cathode active material by calcining under specified conditions the lithium mixture that is obtained in the mixing step, and dispersing lithium into the Al-coated composite hydroxide or roasted material thereof. The furnace that is used in the calcination step is not particularly limited as long as it is capable of calcining a lithium mixture in an oxygen flow, and it is possible to use either a batch type or continuous type furnace.

a) Calcining Atmosphere

The calcining atmosphere must be an oxidizing atmosphere in which the oxygen concentration is 98% by volume or greater, and preferably 99% by volume or greater. Particularly, performing calcination in an oxygen flow is preferred. When the oxygen concentration is less than 98% by volume, it is not possible for the synthesis reaction of the cathode active material to proceed sufficiently, and thus the crystallinity of the cathode active material decreases.

b) Calcination Temperature

The calcination temperature is preferably within the range 700° C. to 800° C., and more preferably within the range 720° C. to 760° C. When the calcination temperature is less than 700° C., lithium and aluminum are not sufficiently dispersed, and there is a possibility that excess lithium or unreacted Al-coated composite hydroxide or the roasted material thereof will remain, or the crystallinity of the obtained cathode active material will be insufficient. On the other hand, when the calcination temperature is greater than 800° C., there is a possibility that severe sintering will occur among the cathode active material, causing abnormal particle growth to occur. In this case, by the percentage of amorphous coarse particles increasing, and the specific surface area being reduced, a problem occurs in that the cathode resistance increases and the charge/discharge capacity decreases.

From the aspect of causing the reaction between Al-coated composite hydroxide or the roasted material thereof and a lithium compound to proceed uniformly, the rate of temperature rise from at least 500° C. to the calcination temperature is preferably within the range 3° C./min to 10° C./min, and more preferably within the range 5° C./min to 8° C./min. Moreover, by maintaining the temperature at a temperature near the melting point of the lithium mixture, for a time preferably within the range 1 hour to 5 hours, and more preferably within the range 3 hours to 5 hours, it is possible to cause the reaction between Al-coated composite hydroxide or roasted material thereof and the lithium compound to proceed more uniformly.

c) Calcining Time

The amount of time (calcining time) during which the temperature is maintained at the calcination temperature is preferably 3 hours or greater, and more preferably is within the range 6 hour to 24 hours. When the calcining time is less than 3 hours, there is a possibility that synthesis of the cathode active material will not proceed sufficiently.

After calcining, the rate of cooling from the calcination temperature to at least 200° C. is preferably within the range 2° C./min to 10° C./min, and more preferably within the range 5° C./min to 10° C./min. As a result, it is possible to prevent damage to equipment such as a saggar and the like due to sudden cooling, while maintaining productivity.

(5) Crushing Process

The cathode active material after the calcination step may have undergone aggregation or light sintering. In such a case, preferably the aggregate or sintered body of cathode active material is crushed. In doing so, it is possible to adjust the average particle size and particle size distribution of the cathode active material to be within a suitable range. Crushing means operation for loosening an aggregate by applying mechanical energy to an aggregate of plural secondary particles that occurred due to sintered necking between secondary particles during calcining, and separating the secondary particles with hardly any damage to the secondary particles.

It is possible to use a known method as the crushing method, and for example, a pin mill, a hammer mill and the like can be used. When doing this, preferably the crushing force is adjusted within a suitable range so that the secondary particles are not damaged.

3. Non-Aqueous Electrolyte Secondary Battery

The non-aqueous electrolyte secondary battery of the present invention includes components that are the same as a typical non-aqueous electrolyte secondary battery, such as a cathode, anode, separator, non-aqueous electrolyte and the like. The embodiment described below is only an example, and the non-aqueous electrolyte secondary battery of the present invention may also be applied to forms that have undergone various modifications or improvements based on the embodiment described in this specification.

(1) Component Members a) Cathode

The cathode active material for a non-aqueous electrolyte secondary battery that is obtained according to the present invention is used as cathode material, and, for example, a non-aqueous electrolyte secondary battery is manufactured as will be described below.

First, a conductive aid and binding agent are mixed into the cathode active material powder that is obtained according to the present invention, then as necessary, activated carbon, a viscosity modifier and other solvents are added, and by mixing and kneading these a cathode mixture paste is manufactured. When doing this, the respective mixture ratios inside the cathode mixture paste are also important elements for determining the performance of the non-aqueous electrolyte secondary battery. For example, when the solid portion of the cathode composite material excluding the solvents is taken to be 100 parts per mass, as in the case of the cathode of a typical non-aqueous electrolyte secondary battery, the amount of cathode active material included can be taken to be within the range 60 parts per mass to 95 parts per mass, the conductive aid can be taken to be 1 part per mass to 20 parts per mass, and the binding agent can be taken to be 1 part per mass to 20 parts per mass.

The obtained cathode mixture paste is applied, for example, to the surface of an aluminum foil current collector, then dried to allow the solvent to scatter. As necessary, in order to increase the electrode density, pressure may be applied using a roll press or the like. In this way, it is possible to manufacture a sheet-shaped cathode. This cathode can be cut to a suitable size according to the target battery, and can be used for manufacturing a battery. However, the method for manufacturing the cathode is not limited to the example described above, and other methods may be used.

The conductive aid is added in order to give suitable conductivity. As the conductive aid, it is possible to use, for example, graphite (natural graphite, artificial graphite, expanded graphite and the like), or a carbon black material such as acetylene black, Ketjen black and the like.

The binding agent serves the role of bonding the particles of the cathode active material, and, for example, it is possible to use polyvinylidene fluoride (PVDF), polytetrafluoroethylene (PTFE), fluororubber, ethylene propylene diene rubber, styrene butadiene, cellulose resin, polyacrylic acid and the like.

Moreover, as described above, as necessary, a solvent in which the cathode active material, the conductive aid and active carbon are dispersed, and the binding agent is dissolved can be added to the cathode composite material. More specifically, as the solvent, it is possible to use an organic solvent such as N-methyl-2-pyrrolidone. Furthermore, in order to increase the electric double layer capacity, active carbon can be added to the cathode composite material.

b) Anode

An anode that is formed, for example, by applying an anode mixture, which is obtained by mixing a binding agent with metallic lithium, a lithium compound or the like, or an anode active material that is capable of intercalating or deintercalating lithium ions, and adding a suitable solvent to form a paste, to the surface of a foil current collector that is made using a metal such as copper or the like, drying, and applying pressure as necessary to increase the electrode density is used.

As the anode active material, it is possible to use, for example, material that includes lithium such as metallic lithium or a lithium compound, an organic compound calcined body such as natural graphite, artificial graphite, phenol resin and the like that is capable of intercalating or deintercalating lithium ions, and a powder of a carbon material such as coke and the like. In this case, as the anode binding agent, it is possible, as in the case of the cathode, to use a fluoro resin such PVDF, and as the solvent for dispersing the cathode active material and binding agent, it is possible to use an organic solvent such as N-methyl-2-pyrrolidone and the like.

c) Separator

The separator is arranged between the cathode and the anode, and has the function of separating the cathode and the anode and holding the electrolyte. As this kind of separator, it is possible, for example, to use a thin film made using polyethylene, polypropylene or the like and having many fine pores; however, the separator is not particularly limited as long as the separator has the functions described above.

d) Non-Aqueous Electrolyte

The non-aqueous electrolyte is obtained by dissolving lithium salt as a supporting salt in an organic solvent.

As the organic solvent, it is possible to use one kind alone or a mixture of two or more kinds selected from among a cyclic carbonate such as ethylene carbonate, propylene carbonate, butylene carbonate, trifluoropropylene carbonate and the like; a chain carbonate such as diethyl carbonate, dimethyl carbonate, ethyl methyl carbonate, dipropyl carbonate and the like; a furthermore an ether compound such as tetrahydrofuran, 2-methyltetrahydrofuran, dimethoxyethane and the like; a sulfur compound such as ethyl methyl sulfone, butane sulton and the like; and a phosphorus compound such as triethyl phosphate, trioctyl phosphate and the like.

As the supporting salt, it is possible to use $LiPF_6$, $LiBF_4$, $LiClO_4$, $LiAsF_6$, $LiN(CF_3SO_2)_2$, a composite salt of these and the like.

Furthermore, the non-aqueous electrolyte may include a radical scavenger, a surfactant, a flame retardant and the like.

(2) Non-Aqueous Electrolyte Secondary Battery

The non-aqueous electrolyte secondary battery of the present invention that includes a cathode, an anode, a separator and a non-aqueous electrolyte as described above can have various shapes such as a cylindrical shape, a layered shape and the like.

No matter what shape is used, the non-aqueous electrolyte secondary battery is obtained by forming an electrode body by layering the cathode and anode via the separator, impregnating this electrode body in the non-aqueous electrolyte, using current-collector leads to connect between the cathode current collector and a cathode terminal that extends to the outside, and between the anode current collector and an anode terminal that extends to the outside, and then sealing the battery case.

(3) Characteristics of Non-aqueous Electrolyte

The non-aqueous electrolyte secondary battery of the present invention, as described above, uses the cathode active material of the present invention as the cathode material, so this non-aqueous electrolyte secondary battery can be evaluated as having excellent charge/discharge capacity, output characteristics, cycling characteristic, and high-temperature storability.

For example, when configuring a 2032 type coin battery such as illustrated in FIG. 3 using the cathode active material of the present invention, it is possible to simultaneously achieve an initial discharge capacity of 199 mAh/g or greater and preferably 200 mAh/g or greater, and a 200-cycle capacity retention rate of 70% or greater and preferably 75% or greater. Moreover, in the case of manufacturing a laminated battery, it is possible to obtain a cathode resistance $R_0$ of 1.01Ω or less and preferably 0.99Ω or less in the initial state. Furthermore, when this laminated battery is stored for 4 weeks in an incubator in which the temperature is maintained at 60° C., a ratio of the cathode resistance $R_4$ after 4 weeks with respect to the initial cathode resistance $R_0$ ($R_4/R_0$) of 2.0 or less and preferably 1.8 or less can be obtained.

(4) Application

As described above, the non-aqueous electrolyte secondary battery of the present invention has excellent charge/discharge capacity, cycling characteristic, and high-temperature storability, so is suitable as the power source for compact portable electronic equipment such as (a notebook computer, portable telephone terminal and the like). Moreover, a non-aqueous electrolyte secondary battery such as that of the present invention can be made compact, and expensive protective circuitry can be simplified, so can also be suitably used as the power source for transport equipment having limited installation space.

EXAMPLES

In the following, the present invention will be explained in further detail using Examples and Comparative Examples.

Example 1 a) Manufacturing Al-Coated Composite Hydroxide

After crystallizing nickel cobalt containing composite hydroxide by a batch type crystallization method, Al-coated composite hydroxide was manufactured by coating the secondary particles of this composite hydroxide with aluminum.

First, nickel sulfate, cobalt sulfate and magnesium sulfate were dissolved in pure water, and 247 L of a raw material aqueous solution having a nickel concentration of 1.65 mol/L, cobalt concentration of 0.31 mol/L, and magnesium concentration of 0.02 mol/L was prepared. At the same time, a reaction aqueous solution was prepared by supplying 140 L of pure water, 6 L of 25% by mass sodium hydroxide aqueous solution, and 6 L of 25% by mass ammonia water to a reaction tank.

The temperature of this reaction aqueous solution was set to 50° C., and by spraying nitrogen gas onto the solution from above, contact between the reaction aqueous solution and oxygen was blocked. In this state, while stirring the reaction aqueous solution, 25% by mass sodium hydroxide aqueous solution was supplied so that the pH value of the solution was maintained at 11.3 at a reference liquid temperature of 25° C., and by supplying the raw material aqueous solution at a rate of 1 L/min, the composite hydroxide was crystallized. When doing this, ammonia water was supplied at a rate of 0.1 L/min so that the ammonium ion concentration of the reaction aqueous solution was maintained at 10 g/L (crystallization step).

After the crystallization step, the reaction aqueous solution (slurry) was filtered, and after solid-liquid separation, the composite hydroxide was washed with pure water (washing step). This composite hydroxide was then put into a vessel containing 150 L of pure water to make a slurry, and while stirring the obtained slurry with a mixer, sodium aluminate aqueous solution having an aluminum concentration of 0.1 mol/L was supplied. After 30 minutes had elapsed, by dripping 10% by mass of sulfate into the solution to adjust the pH value in the vessel to 9.7 at a reference liquid temperature of 25° C., the secondary particles of the composite hydroxide were coated with aluminum. The Al-coated composite hydroxide that was obtained in this way was then filtered and washed with pure water (coating step). Furthermore, the obtained Al-coated composite hydroxide was dried by heating for 24 hours at a temperature of 120° C., and finally a powdered Al-coated composite hydroxide was obtained (drying step).

b) Evaluation of Al-Coated Composite Hydroxide

As a result of analysis using an ICP emission spectrophotometer (ICP-9000, manufactured by Shimadzu Corporation), this Al-coated composite hydroxide was confirmed to be expressed by the general formula: $Ni_{0.82}Co_{0.16}Al_{0.03}Mg_{0.01}(OH)_2$.

[Particle Structure]

As a result of SEM (S-4700 manufactured by Hitachi, Ltd.) observation, this Al-coated composite hydroxide was confirmed to include mostly spherical secondary particles that were formed by an aggregate of rectangular parallelepiped shaped primary particles. Next, this Al-coated composite hydroxide was embedded in resin and after using a cross-section polisher to be put the composite hydroxide into a state in which the cross-section could be observed, SEM observation was similarly performed. As a result, the secondary particles of this Al-coated composite hydroxide were confirmed to have a solid structure.

Moreover, as a result of powder X-ray diffraction measurement, the average particle size (crystallite diameter) of the primary particles of the secondary particles of this Al-coated composite hydroxide was confirmed to be 0.60 μm.

Furthermore, as a result of characteristic X-ray spectroscopic analysis of the particle cross section, it was confirmed that the main portion of the secondary particles of this Al-coated composite hydroxide having a solid structure that includes nickel, cobalt and magnesium was coated by a 0.005 μm thick aluminum hydroxide coating film.

[Average Particle Size, Tap Density and Specific Surface Area]

As a result of measurement using a laser diffraction scattering type particle size analyzer (Microtrac, manufactured by Nikkiso Co., Ltd.), a shaking type specific gravity measurement instrument, and a nitrogen adsorption type BET method measurement device (McSorb, manufactured by Mountech Co., Ltd.), the secondary particles of this Al-coated composite hydroxide were confirmed to have an average particle size of 5.3 μm, a tap density of 1.8 g/mL, and specific surface area of 6.2 m$^2$/g. These results are given in Table 2.

c) Manufacturing of Cathode Active Material

This Al-coated composite hydroxide was put into a cordierite saggar, and using a roasting furnace (FUM373, manufactured by Advantech, Co., Ltd.), oxidation roasting was performed in an air atmosphere at 700° C. for 10 hours, then cooled to room temperature to obtain a roasted material (oxidation roasting step).

Next, a lithium compound was obtained by mixing this roasted material with Lithium hydroxide so that the ratio Li/Me=1.02 (mixing step).

This lithium compound was put into a cordierite saggar, and using a calcining furnace (PVF3060, manufactured by Hirochiku Co., Ltd.) was heated in an oxygen flow at 500° C. for 3 hours, after which the temperature was increased to 730° C. and maintained at this temperature for 10 hours. After that, the lithium compound was cooled to room temperature in an oxygen flow, and by crushing, cathode active material was obtained (pre-calcination step, calcination step and crushing process).

d) Evaluation of Cathode Active Material

[Composition]

As a result of analysis using an ICP emission spectrophotometer, this cathode active material was confirmed to be expressed by the general formula: $Li_{1.02}Ni_{0.81}Co_{0.15}Al_{0.03}Mg_{0.01}O_2$.

[Particle Structure]

As a result of SEM observation, this cathode active material was confirmed to include mostly spherical secondary particles that were formed by an aggregate of rectangular parallelepiped shaped primary particles. Next, this cathode active material was embedded in resin and after using a cross-section polisher to be put the composite hydroxide into a state in which the cross-section could be observed, SEM observation was similarly performed. As a result, this cathode active material was confirmed to have a solid structure.

Moreover, as a result of powder X-ray diffraction measurement, the average particle size (crystallite diameter) of the primary particles of this cathode active material was confirmed to be 0.2 μm, and it was confirmed that the crystal structure was only a layered structure similar to that of lithium nickel oxide ($LiNiO_2$). From this result, it can be understood that the cathode active material is such that cobalt, magnesium and aluminum are uniformly dissolved in solid in a matrix formed by $LiNiO_2$.

[Average Particle Size, Tap Density and Specific Surface Area]

As a result of measurement using a laser diffraction scattering type particle size analyzer, a shaking type specific gravity measurement instrument, and a nitrogen adsorption type BET method measurement device, this cathode active material was confirmed to have an average particle size of 5.5 μm, a tap density of 2.3 g/mL, and specific surface area of 1.0 m$^2$/g. These results are given in Table 3.

e) Manufacture and Evaluation of Secondary Battery

[Evaluation of Charge/Discharge Capacity]

Using this cathode active material, a 2032 type coin battery 1 was manufactured such as illustrated in FIG. 3. First, 85% by mass of the cathode active material described above, 10% by mass of acetylene black, and 5% by mass of PVDF were respectively weighed and mixed, after which a paste was formed by adding a suitable amount of NMP (n-methylpyrrolidone) to this mixture. This cathode mixture paste was applied to aluminum foil so that the surface density of the cathode active material after drying was 7 mg/cm$^2$, then vacuum dried at a temperature of 120° C., after which a cathode 3a was made by punching out a circular plate shape having a diameter of 13 mm. Lithium metal was used for the anode 3b, and an equally mixed solution of ethylene carbonate (EC) and diethyl carbonate (DEC) using 1 M of LiClO$_4$ as a supporting salt was used for the electrolyte, and the 2032 type coin battery 1 was assembled inside a glove box in an argon atmosphere that was controlled so that the dew point was −80° C.

After that, the 2032 type coin battery 1 was left for 24 hours, and after the open circuit voltage (OCV) became stable, the battery was charged to a cutoff voltage of 4.3 V with the current density with respect to the cathode taken to be 0.1 mA/cm$^2$. After stopping for 1 hour, the battery was then discharged to a cutoff voltage of 3.0V, and the initial discharge capacity was found by measuring that discharge capacity. When doing this, a multi-channel voltage/current generator (R6741A, manufactured by Advantest Corporation) was used for measuring the initial discharge capacity. As a result, it was confirmed that the initial discharge capacity is 200.1 mAh/g.

[Evaluation of Cycling Characteristic]

For the 2032 type coin battery described above, the cycling characteristic was evaluated by charging the battery to 4.1V with a current density with respect to the cathode of 360 mA per 1 g of cathode active material, then performing 200 cycles of the operation of discharging the battery to 300V and finding the ratio of the discharge capacity after 200 cycles with respect to the initial discharge capacity (200-cycle capacity retention rate). As a result, it was confirmed that the 200-cycle capacity retention rate is 78%.

[Evaluation of Output Characteristic and High-Temperature Storability]

A laminated type battery was made as in the case of 2032 type coin battery 1. The battery was left for 24 hours and after the open circuit voltage (OCV) became stable, the battery was charged to a cutoff voltage of 4.3 V with the current density with respect to the cathode taken to be 0.1 mA/cm$^2$, then after stopping for 1 hour, the battery was then discharged to a cutoff voltage of 3.0V. When doing this, the discharge capacity and impedance were measured using a multi-channel voltage/current generator.

The laminated type battery was then charged again to a cutoff voltage of 4.3 V after which the battery was stored in an incubator that was maintained at a temperature of 60° C. After one week, the battery was discharged to a cutoff voltage of 3.0 V, and similarly the discharge capacity and impedance were measured. This kind of measurement was repeated for four weeks, and the high-temperature storability of the laminate-type battery was evaluated. The above results are given in Table 4.

Example 2

Except for the magnesium concentration of the raw material aqueous solution being 0.06 mol/L in the crystallization step, Al-coated composite hydroxide, cathode active material and a secondary battery were obtained and evaluation was performed in the same way as in Example 1. The results are given in Table 2 to Table 4. The evaluation results for Examples 3 to 9 and Comparative Example 7 are similarly given in Table 2 to Table 4.

Example 3

Except for the pH value of the reaction aqueous solution being adjusted to 10.8 at a reference liquid temperature of 25° C. in the crystallization step, Al-coated composite hydroxide, cathode active material and a secondary battery were obtained and evaluation was performed in the same way as in Example 1.

Example 4

Except for the pH value of the reaction aqueous solution being adjusted to 11.8 at a reference liquid temperature of 25° C. in the crystallization step, Al-coated composite hydroxide, cathode active material and a secondary battery were obtained and evaluation was performed in the same way as in Example 1.

Example 5

Except for the temperature of the temperature of the reaction aqueous solution being set to 45° C. in the crystallization step, Al-coated composite hydroxide, cathode active material and a secondary battery were obtained and evaluation was performed in the same way as in Example 1.

Example 6

Except for the temperature of the temperature of the reaction aqueous solution being set to 55° C. in the crystallization step, Al-coated composite hydroxide, cathode active material and a secondary battery were obtained and evaluation was performed in the same way as in Example 1.

Example 7

Except for ammonia water being supplied at a rate of 0.08 L/min so that the ammonia concentration of the reaction aqueous solution becomes 8 g/L in the crystallization step, Al-coated composite hydroxide, cathode active material and a secondary battery were obtained and evaluation was performed in the same way as in Example 1.

Example 8

Except for ammonia water being supplied at a rate of 0.12 L/min so that the ammonia concentration of the reaction aqueous solution becomes 12 g/L in the crystallization step, Al-coated composite hydroxide, cathode active material and a secondary battery were obtained and evaluation was performed in the same way as in Example 1.

Example 9

Except for the oxygen concentration in the reaction atmosphere being maintained at 2% by volume in the crystallization step, Al-coated composite hydroxide, cathode active material and a secondary battery were obtained and evaluation was performed in the same way as in Example 1.

Comparative Example 1

Except for using a raw material aqueous solution in which the nickel concentration was 1.65 mol/L, the cobalt concentration was 0.31 mol/L and no magnesium was included in the crystallization step, Al-coated composite hydroxide, cathode active material and a secondary battery were obtained and evaluation was performed in the same way as in Example 1.

Comparative Example 2

Except for using a raw material aqueous solution in which the nickel concentration was 1.65 mol/L, the cobalt concentration was 0.31 mol/L and no magnesium was included in the crystallization step, Al-coated composite hydroxide was obtained in the same way as in Example 1. This Al-coated composite hydroxide was dispersed in pure water, and while stirring, sodium hydroxide aqueous solution was dripped so that the pH value became 10.5. In this state, by supplying a 0.1 mol/L magnesium sulfate aqueous solution, magnesium was precipitated out onto the surface of the secondary particles of the Al-coated composite hydroxide.

Evaluation of this (Al+Mg)-coated composite hydroxide was performed in the same way as in Example 1. Moreover, except for using this (Al+Mg)-coated composite hydroxide, cathode active material and a secondary battery were obtained and evaluated in the same way as in Example 1.

Comparative Example 3

Except for using a 0.2 mol/L magnesium sulfate aqueous solution, (Al+Mg)-coated composite hydroxide, cathode active material and a secondary battery were obtained and evaluated in the same way as in Example 2.

Comparative Example 4

Except for using a raw material aqueous solution in which the nickel concentration was 1.65 mol/L, the cobalt concentration was 0.31 mol/L and no magnesium was included in the crystallization step, recovering the nickel cobalt composite hydroxide by causing the reaction aqueous solution to overflow from the reaction tank and filtering that reaction aqueous solution, and not performing a coating step, nickel cobalt composite hydroxide, cathode active material and a secondary battery were obtained and evaluated in the same way as in Example 1.

Comparative Example 5

Except for using a raw material aqueous solution in which the nickel concentration was 1.65 mol/L, the cobalt concentration was 0.31 mol/L and the magnesium concentration was 0.02 mol/L in the crystallization step, nickel cobalt magnesium composite hydroxide, cathode active material and a secondary battery were obtained and evaluated in the same way as in Comparative Example 4.

Comparative Example 6

Except for using a raw material aqueous solution in which the nickel concentration was 1.65 mol/L, the cobalt concentration was 0.31 mol/L and the magnesium concentration was 0.06 mol/L in the crystallization step, nickel cobalt magnesium composite hydroxide, cathode active material and a secondary battery were obtained and evaluated in the same way as in Comparative Example 4.

Comparative Example 7

Except for the reaction being an oxidizing atmosphere having an oxygen concentration of 21% by volume in the crystallization step, Al-coated composite hydroxide cathode active material, and a secondary battery were obtained and evaluated in the same way as in Example 1.

TABLE 1

| | | Crystallization step | | | | | | Coating step (1) Al | | Coating step (2) Mg | |
|---|---|---|---|---|---|---|---|---|---|---|---|---|
| | Crystallization Method | Ni (mol/L) | Co (mol/L) | Mg (mol/L) | Reaction Atmosphere | Temperature (° C.) | pH value | $NH^{4+}$ (g/L) | Concentration (mol/L) | pH Value | Concentration (mol/L) | pH Value |
| Example 1 | Batch type | 1.65 | 0.31 | 0.02 | $N_2$ | 50 | 11.3 | 10 | 0.1 | 9.7 | — | — |
| Example 2 | Batch type | 1.65 | 0.31 | 0.06 | $N_2$ | 50 | 11.3 | 10 | 0.1 | 9.7 | — | — |
| Example 3 | Batch type | 1.65 | 0.31 | 0.02 | $N_2$ | 50 | 10.8 | 10 | 0.1 | 9.7 | — | — |
| Example 4 | Batch type | 1.65 | 0.31 | 0.02 | $N_2$ | 50 | 11.8 | 10 | 0.1 | 9.7 | — | — |
| Example 5 | Batch type | 1.65 | 0.31 | 0.02 | $N_2$ | 45 | 11.3 | 10 | 0.1 | 9.7 | — | — |
| Example 6 | Batch type | 1.65 | 0.31 | 0.02 | $N_2$ | 55 | 11.3 | 10 | 0.1 | 9.7 | — | — |
| Example 7 | Batch type | 1.65 | 0.31 | 0.02 | $N_2$ | 50 | 11.3 | 8 | 0.1 | 9.7 | — | — |
| Example 8 | Batch type | 1.65 | 0.31 | 0.02 | $N_2$ | 50 | 11.3 | 12 | 0.1 | 9.7 | — | — |
| Example 9 | Batch type | 1.65 | 0.31 | 0.02 | 2% $O_2$ | 50 | 11.3 | 10 | 0.1 | 9.7 | — | — |
| Comparative Example 1 | Batch type | 1.65 | 0.31 | 0 | $N_2$ | 50 | 11.3 | 10 | 0.1 | 9.7 | — | — |
| Comparative Example 2 | Batch type | 1.65 | 0.31 | 0 | $N_2$ | 50 | 11.3 | 10 | 0.1 | 9.7 | 0.1 | 10.5 |
| Comparative Example 3 | Batch type | 1.65 | 0.31 | 0 | $N_2$ | 50 | 11.3 | 10 | 0.1 | 9.7 | 0.2 | 10.5 |
| Comparative Example 4 | Continuous | 1.65 | 0.31 | 0 | $N_2$ | 50 | 11.3 | 10 | — | — | — | — |

TABLE 1-continued

| | | Crystallization step | | | | | | | Coating step (1) | | Coating step (2) | |
| | | | | | | | | | Al | | Mg | |
| | Crystallization Method | Ni (mol/L) | Co (mol/L) | Mg (mol/L) | Reaction Atmosphere | Temperature (° C.) | pH value | NH$^{4+}$ (g/L) | Concentration (mol/L) | pH Value | Concentration (mol/L) | pH Value |
|---|---|---|---|---|---|---|---|---|---|---|---|---|
| Comparative Example 5 | Continuous | 1.65 | 0.31 | 0.02 | N$_2$ | 50 | 11.3 | 10 | — | — | — | — |
| Comparative Example 6 | Continuous | 1.65 | 0.31 | 0.06 | N$_2$ | 50 | 11.3 | 10 | — | — | — | — |
| Comparative Example 2 | Batch type | 1.65 | 0.31 | 0.02 | 21% O$_2$ | 50 | 11.3 | 10 | 0.1 | 9.7 | — | — |

TABLE 2

| | | | | Primary Particles | | Secondary Particles | | |
| | General Formula | Particle Structure | Coating Film Thickness (μm) | Shape | Average Particle Size (μm) | Shape | Average Particle Size (μm) | Tap Density (g/ml) | Specific Surface Area (m$^2$/g) |
|---|---|---|---|---|---|---|---|---|---|
| Example 1 | Ni$_{0.81}$Co$_{0.15}$Al$_{0.03}$Mg$_{0.01}$(OH)$_2$ | Al coated/Solid structure | 0.005 | Rectangular parallelepiped | 0.06 | Mostly spherical | 5.3 | 1.8 | 6.2 |
| Example 2 | Ni$_{0.80}$Co$_{0.14}$Al$_{0.03}$Mg$_{0.03}$(OH)$_2$ | Al coated/Solid structure | 0.005 | Rectangular parallelepiped | 0.05 | Mostly spherical | 5.3 | 1.6 | 6.0 |
| Example 3 | Ni$_{0.81}$Co$_{0.15}$Al$_{0.03}$Mg$_{0.01}$(OH)$_2$ | Al coated/Solid structure | 0.004 | Rectangular parallelepiped | 0.04 | Mostly spherical | 5.4 | 1.7 | 5.6 |
| Example 4 | Ni$_{0.81}$Co$_{0.15}$Al$_{0.03}$Mg$_{0.01}$(OH)$_2$ | Al coated/Solid structure | 0.004 | Rectangular parallelepiped | 0.06 | Mostly spherical | 4.4 | 1.8 | 6.1 |
| Example 5 | Ni$_{0.81}$Co$_{0.15}$Al$_{0.03}$Mg$_{0.01}$(OH)$_2$ | Al coated/Solid structure | 0.006 | Rectangular parallelepiped | 0.05 | Mostly spherical | 5.5 | 1.9 | 5.7 |
| Example 6 | Ni$_{0.81}$Co$_{0.15}$Al$_{0.03}$Mg$_{0.01}$(OH)$_2$ | Al coated/Solid structure | 0.004 | Rectangular parallelepiped | 0.05 | Mostly spherical | 4.3 | 1.6 | 7.2 |
| Example 7 | Ni$_{0.81}$Co$_{0.15}$Al$_{0.03}$Mg$_{0.01}$(OH)$_2$ | Al coated/Solid structure | 0.004 | Rectangular parallelepiped | 0.05 | Mostly spherical | 5.1 | 1.8 | 6.6 |
| Example 8 | Ni$_{0.81}$Co$_{0.15}$Al$_{0.03}$Mg$_{0.01}$(OH)$_2$ | Al coated/Solid structure | 0.004 | Rectangular parallelepiped | 0.05 | Mostly spherical | 5.6 | 1.9 | 6.3 |
| Example 9 | Ni$_{0.81}$Co$_{0.15}$Al$_{0.03}$Mg$_{0.01}$(OH)$_2$ | Al coated/Solid structure | 0.004 | Rectangular parallelepiped | 0.04 | Mostly spherical | 4.2 | 1.5 | 7.5 |
| Comparative Example 1 | Ni$_{0.81}$Co$_{0.15}$Al$_{0.04}$(OH)$_2$ | Al coated/Solid structure | — | Rectangular parallelepiped | 0.05 | Mostly spherical | 4.6 | 1.6 | 7.1 |
| Comparative Example 2 | Ni$_{0.81}$Co$_{0.14}$Al$_{0.04}$Mg$_{0.01}$(OH)$_2$ | Al + Mg coated/Solid structure | 0.005 | Rectangular parallelepiped | 0.05 | Mostly spherical | 4.6 | 1.7 | 7.3 |
| Comparative Example 3 | Ni$_{0.80}$Co$_{0.13}$Al$_{0.04}$Mg$_{0.03}$(OH)$_2$ | Al + Mg coated/Solid structure | 0.007 | Rectangular parallelepiped | 0.05 | Mostly spherical | 4.6 | 1.8 | 6.4 |
| Comparative Example 4 | Ni$_{0.84}$Co$_{0.16}$(OH)$_2$ | No coating/Solid structure | — | Rectangular parallelepiped | 0.06 | Mostly spherical | 11.1 | 2.4 | 3.0 |
| Comparative Example 5 | Ni$_{0.83}$Co$_{0.15}$Mg$_{0.02}$(OH)$_2$ | No coating/Solid structure | — | Rectangular parallelepiped | 0.07 | Mostly spherical | 10.8 | 2.3 | 3.5 |
| Comparative Example 6 | Ni$_{0.80}$Co$_{0.15}$Mg$_{0.05}$(OH)$_2$ | No coating/Solid structure | — | Rectangular parallelepiped | 0.06 | Mostly spherical | 10.8 | 2.2 | 3.6 |
| Comparative Example 7 | Ni$_{0.81}$Co$_{0.15}$Al$_{0.03}$Mg$_{0.01}$(OH)$_2$ | Al coated/Solid structure | 0.004 | Rectangular parallelepiped | 0.05 | Mostly spherical | 3.0 | 1.7 | 6.4 |

TABLE 3

| | | | Primary Particles | | Secondary Particles | | |
| | General Formula | Particle Structure | Shape | Average Particle Size (μm) | Shape | Average Particle Size (μm) | Tap Density (g/ml) | Specific Surface Area (m$^2$/g) |
|---|---|---|---|---|---|---|---|---|
| Example 1 | Li$_{1.02}$Ni$_{0.81}$Co$_{0.15}$Al$_{0.03}$Mg$_{0.01}$O$_2$ | Solid structure | Rectangular parallelepiped | 0.2 | Mostly spherical | 5.5 | 2.3 | 1.00 |
| Example 2 | Li$_{1.02}$Ni$_{0.80}$Co$_{0.14}$Al$_{0.03}$Mg$_{0.03}$O$_2$ | Solid structure | Rectangular parallelepiped | 0.2 | Mostly spherical | 5.5 | 2.2 | 0.90 |
| Example 3 | Li$_{1.02}$Ni$_{0.81}$Co$_{0.15}$Al$_{0.03}$Mg$_{0.01}$O$_2$ | Solid structure | Rectangular parallelepiped | 0.3 | Mostly spherical | 5.6 | 2.3 | 0.80 |

TABLE 3-continued

|  | General Formula | Particle Structure | Primary Particles Shape | Primary Particles Average Particle Size (μm) | Secondary Particles Shape | Secondary Particles Average Particle Size (μm) | Tap Density (g/ml) | Specific Surface Area (m²/g) |
|---|---|---|---|---|---|---|---|---|
| Example 4 | $Li_{1.02}Ni_{0.81}Co_{0.15}Al_{0.03}Mg_{0.01}O_2$ | Solid structure | Rectangular parallelepiped | 0.1 | Mostly spherical | 4.5 | 2.2 | 1.00 |
| Example 5 | $Li_{1.02}Ni_{0.81}Co_{0.15}Al_{0.03}Mg_{0.01}O_2$ | Solid structure | Rectangular parallelepiped | 0.4 | Mostly spherical | 5.7 | 2.3 | 0.90 |
| Example 6 | $Li_{1.02}Ni_{0.81}Co_{0.15}Al_{0.03}Mg_{0.01}O_2$ | Solid structure | Rectangular parallelepiped | 0.5 | Mostly spherical | 4.4 | 2.1 | 1.00 |
| Example 7 | $Li_{1.02}Ni_{0.81}Co_{0.15}Al_{0.03}Mg_{0.01}O_2$ | Solid structure | Rectangular parallelepiped | 0.3 | Mostly spherical | 5.2 | 2.2 | 1.00 |
| Example 8 | $Li_{1.02}Ni_{0.81}Co_{0.15}Al_{0.03}Mg_{0.01}O_2$ | Solid structure | Rectangular parallelepiped | 0.4 | Mostly spherical | 5.8 | 2.2 | 0.80 |
| Example 9 | $Li_{1.02}Ni_{0.81}Co_{0.15}Al_{0.03}Mg_{0.01}O_2$ | Solid structure | Rectangular parallelepiped | 0.3 | Mostly spherical | 4.3 | 2.0 | 1.00 |
| Comparative Example 1 | $Li_{1.02}Ni_{0.81}Co_{0.15}Al_{0.04}O_2$ | Solid structure | Rectangular parallelepiped | 0.2 | Mostly spherical | 4.8 | 1.7 | 1.18 |
| Comparative Example 2 | $Li_{1.02}Ni_{0.81}Co_{0.14}Al_{0.04}Mg_{0.01}O_2$ | Solid structure | Rectangular parallelepiped | 0.3 | Mostly spherical | 4.7 | 1.6 | 1.23 |
| Comparative Example 3 | $Li_{1.02}Ni_{0.80}Co_{0.13}Al_{0.04}Mg_{0.03}O_2$ | Solid structure | Rectangular parallelepiped | 0.2 | Mostly spherical | 4.7 | 1.6 | 1.28 |
| Comparative Example 4 | $Li_{1.02}Ni_{0.84}Co_{0.16}O_2$ | Solid structure | Rectangular parallelepiped | 0.6 | Mostly spherical | 11.1 | 2.5 | 0.43 |
| Comparative Example 5 | $Li_{0.02}Ni_{0.83}Co_{0.15}Mg_{0.02}O_2$ | Solid structure | Rectangular parallelepiped | 0.6 | Mostly spherical | 11.0 | 2.5 | 0.56 |
| Comparative Example 6 | $Li_{1.02}Ni_{0.80}Co_{0.15}Mg_{0.05}O_2$ | Solid structure | Rectangular parallelepiped | 0.5 | Mostly spherical | 10.9 | 2.5 | 0.44 |
| Comparative Example 7 | $Li_{1.02}Ni_{0.81}Co_{0.15}Al_{0.03}Mg_{0.01}O_2$ | Solid structure | Rectangular parallelepiped | 0.2 | Mostly spherical | 3.5 | 1.5 | 1.40 |

TABLE 4

|  | 2032 Type Coin Battery | | Laminated Type Battery | | | | | | | | | | |
|---|---|---|---|---|---|---|---|---|---|---|---|---|---|
|  | Initial | 200-cyle | Discharge Capacity | | | | | Impedance (Ω) | | | | | |
|  | Discharge Capacity (mAh/g) | Capacity Retention Rate (%) | Initial (mAh/g) | After 1 week (mAh/g) | After 2 weeks (mAh/g) | After 3 weeks (mAh/g) | After 4 weeks (mAh/g) | Initial R1 (Ω) | After 1 week $R_1$ (Ω) | After 2 weeks $R_2$ (Ω) | After 3 weeks $R_3$ (Ω) | After 4 weeks $R_4$ (Ω) | $R_4/R_0$ |
| Example 1 | 200.1 | 78 | 195 | 190 | 183 | 170 | 165 | 0.99 | 1.03 | 1.3 | 1.6 | 1.8 | 1.8 |
| Example 2 | 199.0 | 76 | 194 | 191 | 182 | 168 | 164 | 1.00 | 1.08 | 1.4 | 1.7 | 1.9 | 1.9 |
| Example 3 | 199.8 | 77 | 194 | 190 | 184 | 169 | 165 | 0.99 | 1.06 | 1.4 | 1.6 | 1.9 | 1.9 |
| Example 4 | 200.2 | 78 | 193 | 190 | 181 | 169 | 166 | 0.99 | 1.02 | 1.3 | 1.5 | 1.8 | 1.8 |
| Example 5 | 200.1 | 77 | 192 | 189 | 182 | 167 | 163 | 1.01 | 1.08 | 1.6 | 1.8 | 2.0 | 2.0 |
| Example 6 | 200.2 | 75 | 195 | 193 | 184 | 166 | 163 | 1.00 | 1.07 | 1.5 | 1.8 | 1.9 | 1.9 |
| Example 7 | 200.0 | 76 | 194 | 192 | 181 | 168 | 164 | 1.01 | 1.06 | 1.4 | 1.7 | 2.0 | 2.0 |
| Example 8 | 199.7 | 77 | 195 | 192 | 183 | 171 | 162 | 1.00 | 1.05 | 1.5 | 1.7 | 1.8 | 1.8 |
| Example 9 | 199.8 | 75 | 193 | 189 | 183 | 168 | 164 | 0.99 | 1.01 | 1.2 | 1.5 | 1.9 | 1.9 |
| Comparative Example 1 | 197.2 | 72 | 192 | 186 | 178 | 168 | 159 | 0.99 | 1.01 | 1.3 | 1.9 | 2.5 | 2.5 |
| Comparative Example 2 | 197.3 | 70 | 191 | 187 | 180 | 174 | 168 | 1.04 | 1.09 | 1.4 | 1.8 | 2.2 | 2.1 |
| Comparative Example 3 | 189.8 | 71 | 187 | 179 | 172 | 167 | 165 | 1.01 | 1.03 | 1.4 | 1.7 | 2.1 | 2.1 |
| Comparative Example 4 | 187.4 | 69 | 185 | 176 | 168 | 162 | 154 | 1.05 | 1.12 | 1.6 | 2.3 | 2.9 | 2.8 |
| Comparative Example 5 | 185.0 | 70 | 183 | 177 | 168 | 150 | 146 | 1.07 | 1.14 | 1.7 | 2.2 | 2.8 | 2.6 |
| Comparative Example 6 | 169.9 | 71 | 164 | 160 | 156 | 151 | 148 | 1.03 | 1.05 | 1.4 | 2.2 | 2.7 | 2.6 |
| Comparative Example 7 | 189.0 | 68 | 186 | 178 | 169 | 161 | 157 | 1.01 | 1.04 | 1.3 | 2.0 | 2.3 | 2.3 |

EXPLANATION OF REFERENCE NUMBERS

1 Coin type battery
2 Case
2a Cathode can
2b Anode can
2c Gasket
3 Electrode
3a Cathode
3b Anode
3c Separator

What is claimed is:

1. An aluminum-coated nickel cobalt composite hydroxide that consists of: $Ni_{1-x-y-z}Co_xAl_yMg_z(OH)_2$ (where, $0.05 \leq x \leq 0.20$, $0.01 \leq y \leq 0.06$, and $0.01 \leq z \leq 0.03$), and includes secondary particles, wherein
the secondary particles have a structure in which a main part has a solid structure that is formed by an aggregate of plural primary particles and in which nickel, cobalt, and magnesium are uniformly dispersed, the main part coated by a coating film that includes aluminum or an aluminum compound;
the average particle size of the secondary particles being within the range 4 μm to 7 μm or less, the tap density being 1.5 g/mL or greater, and the specific surface area being within the range 5.5 m$^2$/g to 7.5 m$^2$/g.

2. The aluminum-coated nickel cobalt containing composite hydroxide according to claim 1, wherein the thickness of the coating film is within the range 0.001 μm to 0.01 μm.

3. The aluminum-coated nickel cobalt containing composite hydroxide according to claim 1, wherein the primary particles have a rectangular parallelepiped shape, and the average particle size of the primary particles is within the range 0.01 μm to 0.1 μm.

4. A method for manufacturing an aluminum-coated nickel cobalt containing composite hydroxide that is expressed by a general formula: $Ni_{1-x-y-z}Co_xAl_yMg_z(OH)_2$ (where, $0.05 \leq x \leq 0.20$, $0.01 \leq y \leq 0.06$, and $0.01 \leq z \leq 0.03$), comprising:
a crystallization step for obtaining nickel cobalt containing composite hydroxide that includes secondary particles having a solid structure that is formed by an aggregate of plural primary particles using a batch type crystallization method in which a raw material aqueous solution that includes nickel, cobalt and magnesium is supplied in an inert atmosphere to a reaction aqueous solution that is controlled so that the temperature is within the range 45° C. to 55° C., the pH value is within the range 10.8 to 11.8 at a reference liquid temperature of 25° C., and the ammonium-ion concentration is within the range 8 g/L to 12 g/L; and
a coating step for obtaining an aluminum-coated nickel cobalt containing composite hydroxide by mixing a slurry that includes the nickel cobalt containing composite hydroxide with a coating aqueous solution that includes aluminum to form a mixed aqueous solution, and coating the secondary particles with a coating film that includes aluminum or an aluminum compound.

5. The method for manufacturing an aluminum-coated nickel cobalt containing composite hydroxide according to claim 4, wherein the pH value of the mixed aqueous solution is controlled to be within the range 9.6 to 10.4 at a reference liquid temperature of 25° C.

6. The method for manufacturing an aluminum-coated nickel cobalt containing composite hydroxide according to claim 4, further comprising a drying step for drying the aluminum-coated nickel cobalt containing composite hydroxide by heating the aluminum-coated nickel cobalt containing composite hydroxide to a temperature within the range 110° C. to 130° C.

\* \* \* \* \*